(12) United States Patent
Peacock et al.

(10) Patent No.: US 8,336,833 B2
(45) Date of Patent: Dec. 25, 2012

(54) MODULAR GRID SYSTEM

(75) Inventors: Bobbie Don Peacock, Peachtree City, GA (US); Bryan N. Wilmoth, Griffin, GA (US); Edward G. Green, Newnan, GA (US); Thomas W. Windham, Jr., Brooks, GA (US); Brian Scott Peacock, Peachtree City, GA (US); Thomas Joseph Holak, Peachtree City, GA (US)

(73) Assignee: M.A. Industries, Inc., Peachtree City, GA (US)

( * ) Notice: Subject to any disclaimer, the term of this patent is extended or adjusted under 35 U.S.C. 154(b) by 194 days.

(21) Appl. No.: 12/781,279

(22) Filed: May 17, 2010

(65) Prior Publication Data

US 2011/0030309 A1 Feb. 10, 2011

Related U.S. Application Data

(60) Provisional application No. 61/216,262, filed on May 15, 2009.

(51) Int. Cl.
*F16L 3/22* (2006.01)

(52) U.S. Cl. ........ 248/68.1; 248/49; 52/220.3; 52/220.8

(58) Field of Classification Search .................. 52/220.1, 52/220.2, 220.3, 220.8, 323, 380, 576, 592.6, 52/659, 98, 100; 248/49, 68.1
See application file for complete search history.

(56) References Cited

U.S. PATENT DOCUMENTS

| | | | |
|---|---|---|---|
| 3,464,661 A | 9/1969 | Alesi, Jr. | |
| 3,523,667 A | 8/1970 | Guerrero | |
| 3,856,246 A | 12/1974 | Sinko | |
| 3,964,707 A | 6/1976 | Lewis | |
| 4,007,941 A | 2/1977 | Stancati | |
| 4,075,803 A | 2/1978 | Alesi, Jr. | |
| 4,099,626 A | 7/1978 | Magnussen, Jr. | |
| 4,199,070 A | 4/1980 | Magnussen, Jr. | |
| 4,244,542 A | 1/1981 | Mathews | |
| 4,601,447 A | 7/1986 | McFarland | |
| 4,618,114 A | 10/1986 | McFarland | |
| 5,230,190 A | 7/1993 | Schuette | |
| 6,053,456 A | 4/2000 | Dispenza | |
| D447,931 S * | 9/2001 | Aitken | D8/354 |
| 6,715,247 B1 | 4/2004 | Sanftleben et al. | |
| 6,792,726 B1 * | 9/2004 | Price | 52/220.8 |
| 6,902,138 B2 | 6/2005 | Vantouroux | |
| 7,281,356 B2 | 10/2007 | Sanftleben et al. | |
| 7,434,771 B1 | 10/2008 | Tai | |

(Continued)

*Primary Examiner* — Brian Glessner
*Assistant Examiner* — James Buckle, Jr.
(74) *Attorney, Agent, or Firm* — Kilpatrick Townsend & Stockton LLP (57) ABSTRACT

Embodiments of the present invention provide modular grid systems for use with aperture-forming devices. The modular grid system includes a plurality of modular grids, wherein each modular grid includes an outer frame, an outer partial ring coupled to the frame, and at least one inner partial ring coupled to the outer partial ring via at least one securable connection, wherein the outer partial ring and the at least one inner partial ring form arcs of greater than 180 degrees but less than 360 degrees. Each modular grid is coupled to an adjacent modular grid. In some embodiments, the outer frame comprises a removable bar. In some embodiments, the plurality of modular grids are oriented in the same direction. In some embodiments, the modular grid is configured to couple to an aperture-forming device, where the aperture-forming device has a diameter ranging from 2 to 6 inches.

33 Claims, 6 Drawing Sheets

U.S. PATENT DOCUMENTS

2004/0060249 A1* 4/2004 Sanftleben et al. .......... 52/220.8
2006/0108481 A1* 5/2006 Riedy et al. ................. 248/68.1
2007/0215757 A1* 9/2007 Yuta ............................. 248/68.1
2009/0193731 A1 8/2009 Fabinski

* cited by examiner

MODULAR GRID SYSTEM

CROSS REFERENCE TO RELATED APPLICATIONS

This application is related to and claims priority benefits from U.S. Provisional Application Ser. No. 61/216,262, filed on May 15, 2009, entitled MODULAR GRID SYSTEM. The '262 application is hereby incorporated in its entirety by this reference.

FIELD OF THE INVENTION

The field of the invention relates to systems for forming passages in concrete walls for later passage of objects through the passages.

BACKGROUND

Many concrete walls are foamed with apertures to provide space through which pipes, wiring, ducts, or other conduits may pass. Traditionally, these apertures have been created by positioning some type of aperture-forming device, such as a tube or other hollow object, in a form before introducing the concrete. One or both ends of the tubular opening on the aperture-forming devices are usually covered by a cap, seal, or other type of membrane to prevent concrete from entering the voids created by these devices.

Traditionally, these aperture-forming devices were held in place within the concrete form by securing the aperture-forming devices directly to the form. Such a method, however, is undesirable as it is labor-intensive and can damage the form such that it cannot be re-used. Other techniques utilize a grid system, where two grid sections are snapped together to encircle the entire diameter of the aperture-forming device. One drawback of these grid systems is that they cannot be installed in the concrete form prior to installation of the aperture-forming devices because the grid system is designed to snap-fit around the aperture-forming device before the next section is installed. Moreover, these grid systems typically require two modular grid components to secure one aperture-forming device. Also, because the grid sections are typically formed of rigid structures, it is difficult, if not impossible, to insert aperture-forming devices after the installation of the grid system.

SUMMARY

Embodiments of the present invention provide modular grid systems for use with aperture-forming devices. The modular grid system includes a plurality of modular grids, wherein each modular grid includes an outer frame, an outer partial ring positioned inside of and coupled to the outer frame, and at least one inner partial ring positioned inside of and coupled to the outer partial ring via at least one securable connection, wherein the outer partial ring and the at least one inner partial ring form arcs of greater than 180 degrees but less than 360 degrees. In some embodiments, the outer frame comprises a removable bar.

In some embodiments, the at least one securable connection includes at least one frangible connection. In other embodiments, the at least one frangible connection comprises at least one recessed notch coupled to at least one tab. In some embodiments, the outer frame, the outer partial ring, and the at least one inner partial ring are integrally formed. In some embodiments, the plurality of modular grids are oriented in the same direction. In some embodiments, each modular grid is configured to couple to an aperture-forming device, where the aperture-forming device has a diameter ranging from 2 to 6 inches.

In some embodiments, the at least one inner partial ring includes a plurality of inner partial rings, wherein at least one larger diameter inner partial ring is coupled to at least one smaller diameter inner partial ring via at least one securable connection.

DETAILED DESCRIPTION

Embodiments of the invention provide modular grid systems for use with aperture-forming devices. While the modular grid systems are discussed herein for use with concrete forms and duct terminators, they are by no means so limited. Rather, embodiments of the modular grid system may be used in molds or forms of any type or otherwise as desired.

FIGS. 1-7 illustrate one embodiment of a modular grid 10. The modular grid 10 comprises an outer frame 12, an outer partial ring 14, and at least one inner partial ring 16. In one embodiment, the outer frame 12 comprises a lower portion 18 and two side portions 20, 22 that are integrally formed to one another so that the outer frame 12 forms a "u" shaped structure. However, one of skill in the relevant art will understand that the outer frame 12 may have any suitable shape that provides support to the outer partial ring 14, including rectilinear, oval, circular, and any other suitable shape. The outer frame 12 may be formed of any suitable material including but not limited to thermoplastic, polystyrene, polyethylene, or other suitable material.

Figure 1:
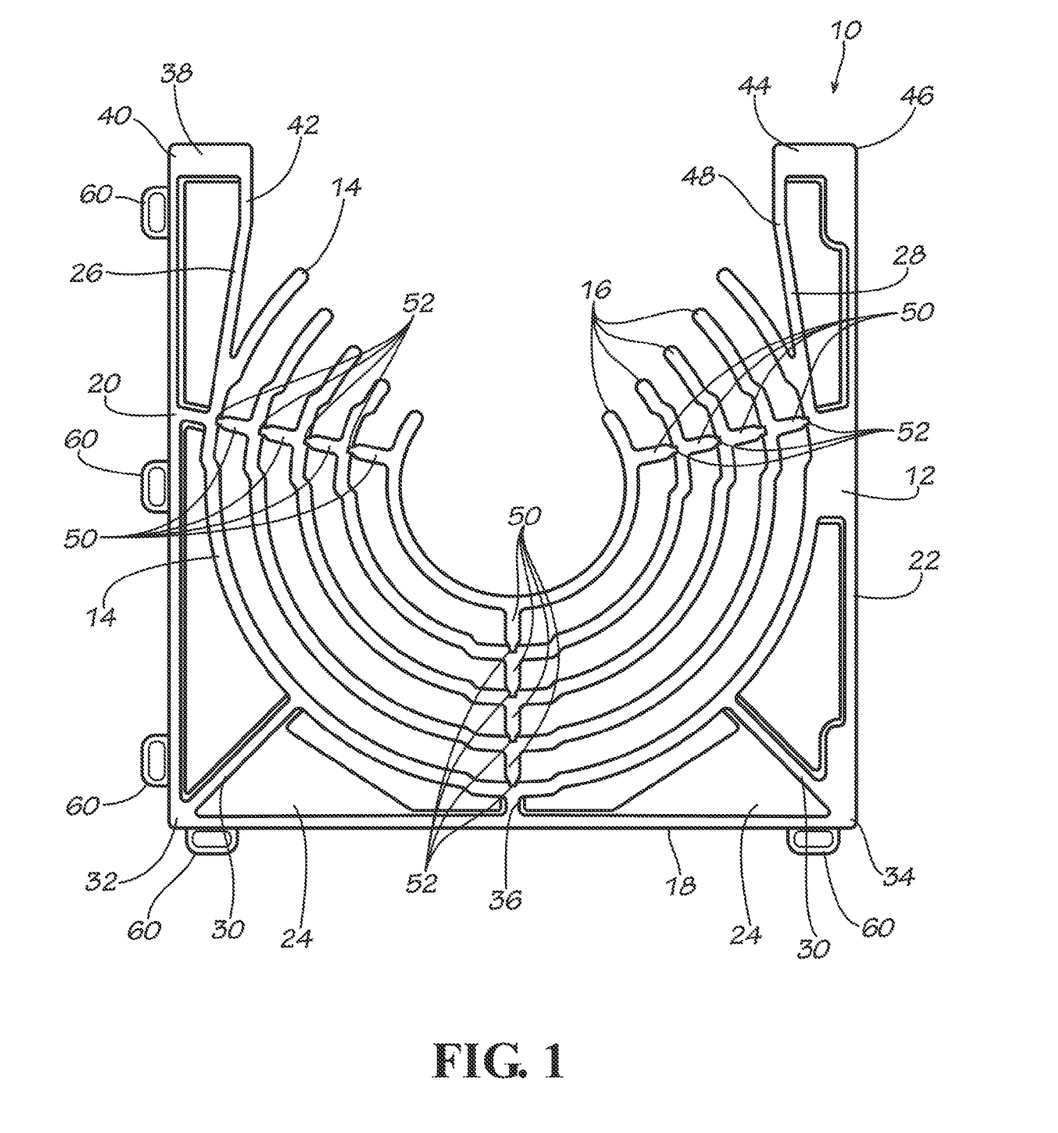
FIG. 1 is front view of a modular grid according to one embodiment of the present invention.

In one embodiment, the outer partial ring 14 is coupled to the outer frame 12 via a support structure 24 that extends from the lower portion 18 of the outer frame 12 to contact the outer partial ring 14 and two support structures 26, 28 that extend from the side portions 20, 22 of the outer frame 12 to contact the outer partial ring 14. In this embodiment, the support structure 24 includes an extension 30 that couples each corner 32, 34 of the outer frame 12 to the outer partial ring 14. In this embodiment, the outer partial ring 14 is also coupled to the lower portion 18 via a tab 36. The support structure 26 includes a bar 38 that extends from an upper end 40 of the side portion 20. The bar 38 includes an extension 42 that couples the bar 38 to the outer partial ring 14. Likewise, in this embodiment, the support structure 28 includes a bar 44 that extends from an upper end 46 of the side portion 22. The bar 44 includes an extension 48 that couples the bar 44 to the outer partial ring 14. Other frangible or non-frangible but severable connections could also be used to secure outer partial ring 14 to the outer frame 12.

In one embodiment shown in FIGS. 1 and 4-6, the outer partial ring 14 is coupled to the at least one inner partial ring 16 via tabs 50. As shown in detail in FIG. 6, the outer partial ring 14 and/or the at least one inner ring 16 includes at least one recessed notch 52 along its circumference for coupling to a smaller diameter inner partial ring 16 via tabs 50. In some embodiments, the inner partial ring 16 includes a plurality of inner partial rings 16, wherein at least one larger diameter inner partial ring 16 is coupled to at least one smaller diameter inner partial ring 16 via at least one securable connection.

Figure 6:
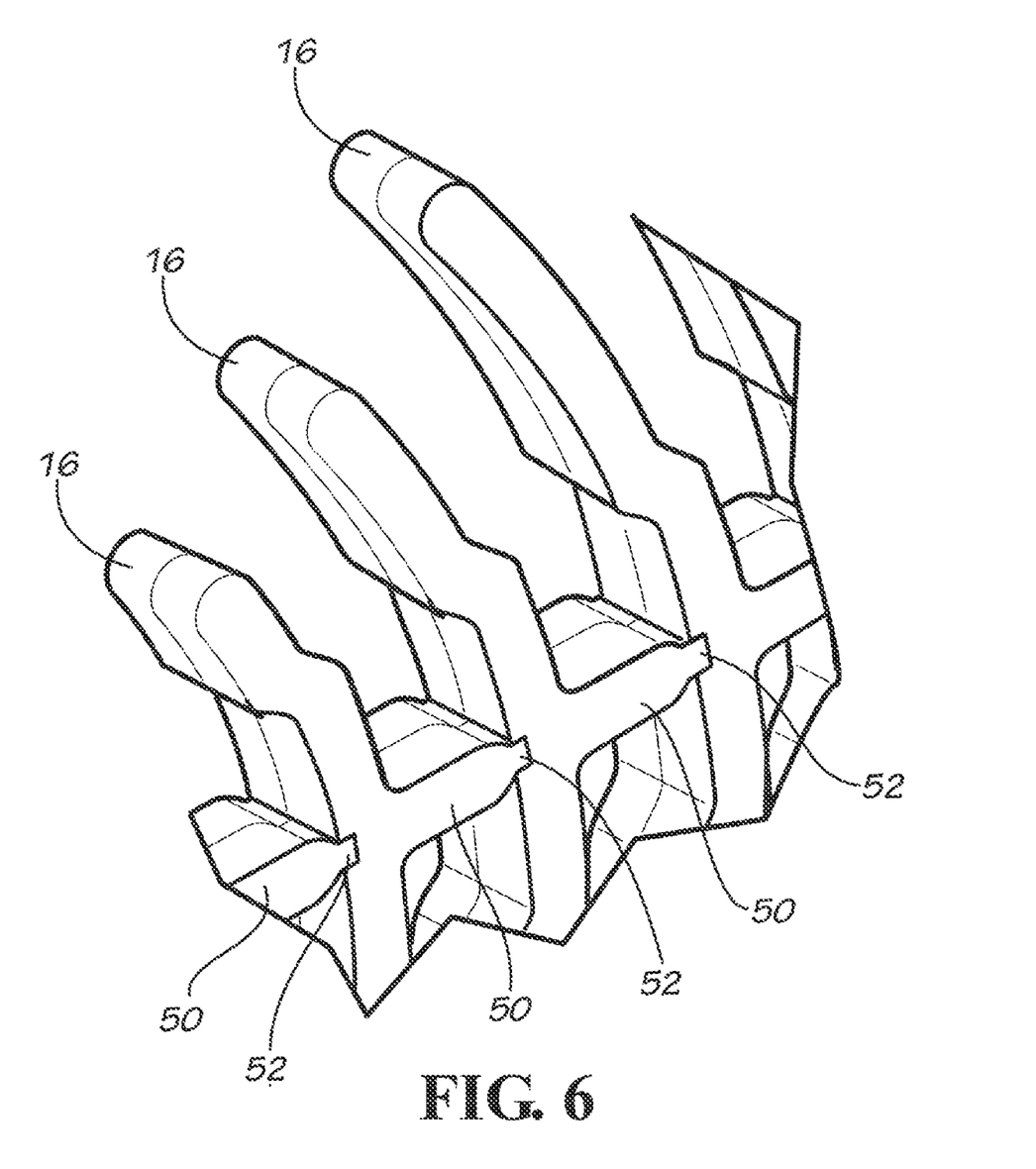
FIG. 6 is a perspective view of a portion of the modular grid of FIG. 1.

In these embodiments, the at least one recessed notch 52 is coupled to the tab 50 extending therefrom that allows easy removal of the smaller diameter unused inner partial ring 16 and will not interfere with the fit of an aperture-forming device 54 in the retained partial ring(s). These structures, however, are not necessarily present in all embodiments. The combination of tabs 50 and recessed notches 52 allows for easy removal of the smaller diameter inner partial ring 16 from the larger diameter inner partial ring 16 and/or the outer partial ring 14. Other frangible or non-frangible but severable connections could also be used to secure the inner partial rings 16 to one another and/or to secure the at least one inner partial ring 16 to the outer partial ring 14.

Figure 4:
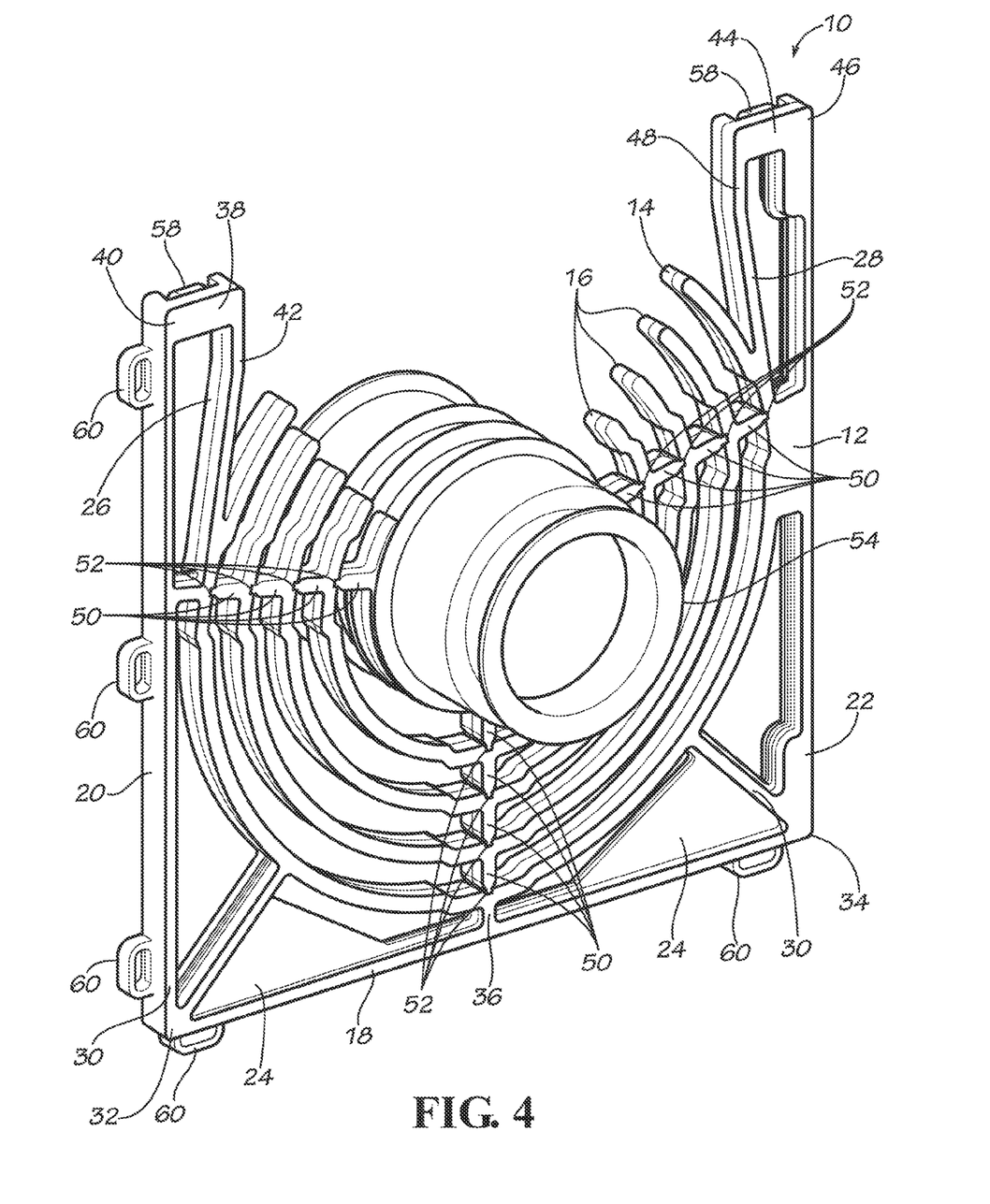
FIG. 4 is a perspective view of the modular grid of FIG. 1 coupled to an aperture-forming device.
Figure 5:
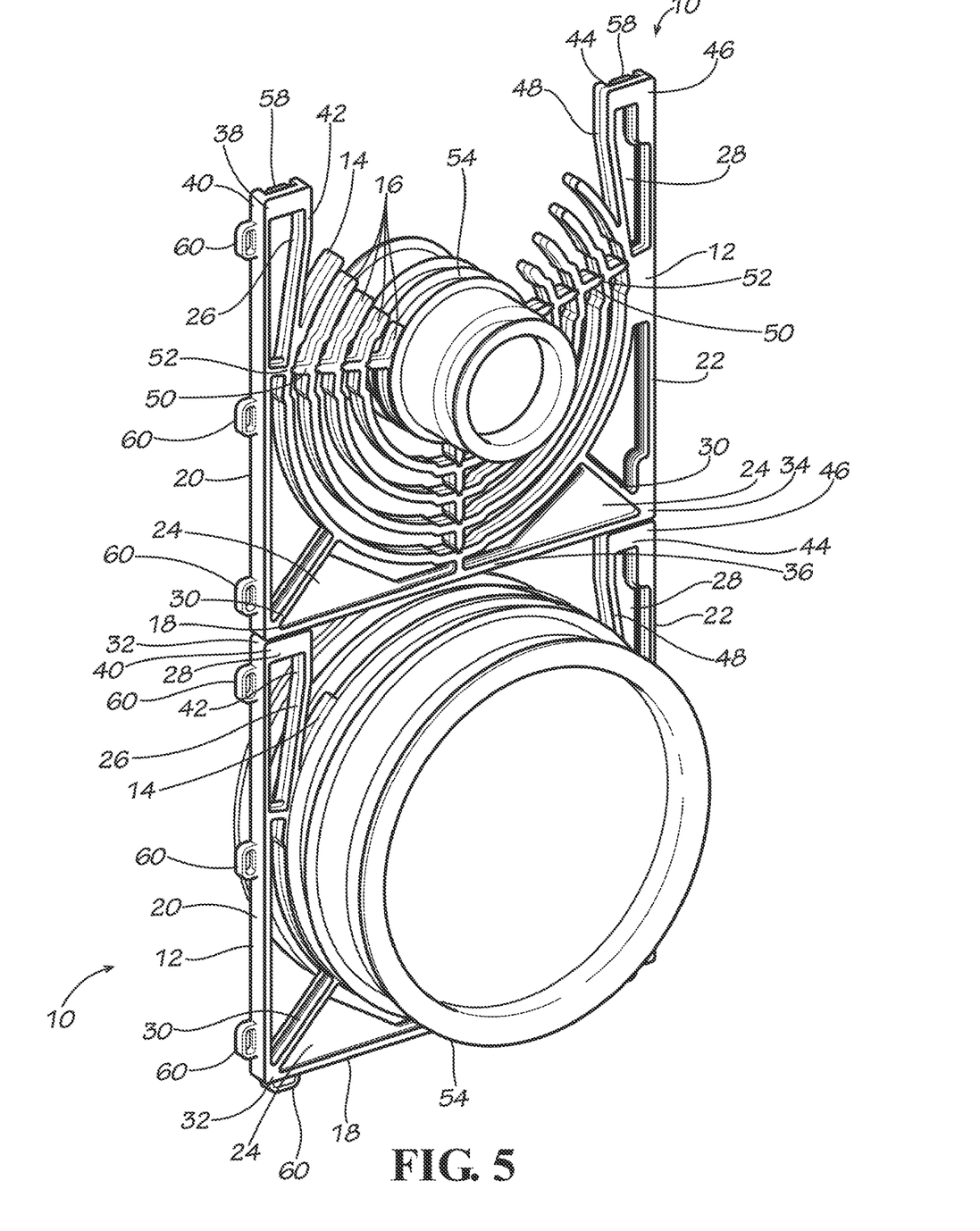
FIG. 5 is a perspective view of the modular grid of FIG. 1 coupled to an adjacent modular grid and an aperture-forming device.

The aperture-forming device 54, as illustrated in FIGS. 4-5, may include devices such as a duct terminator, a pipe, or other similar device having a cross-sectional area that conforms to the shape of the outer partial ring 14 and/or the at least one inner partial ring 16, or that is amenable for retention by an appropriately shaped partial ring. The aperture-forming device 54 may be formed of thermoplastic, polystyrene, polyethylene, or other suitable material. Moreover, the aperture-forming device 54 may have multiple cross-sectional areas along its length, providing for a plurality of cross-sectional areas that may be coupled to the outer partial ring 14 and/or the at least one inner partial ring 16.

The outer partial ring 14, the at least one inner partial ring 16, and the support structures 24, 26, and 28 may be formed of any suitable material including but not limited to thermoplastic, polystyrene, polyethylene, or other suitable material. In some embodiments, the entire modular grid 10 is integrally formed. For example, the outer partial ring 14 and the at least one inner partial ring 16 may be formed from an at least somewhat resilient material, such as a plastic, that allows the outer partial ring 14 and the at least one inner partial ring 16 to snap-fit around the aperture-forming device 54 and at least somewhat secure the aperture-forming device 54 in place. In some embodiments, the connection between the aperture-forming device 54 and the outer partial ring 14 or the at least one inner partial ring 16 will not be completely rigid, and the aperture-forming device 54 may still be able to move somewhat (in translation and/or rotation). In other embodiments, the aperture-forming device 54 positioned in the outer partial ring 14 or the at least one inner partial ring 16 may also contact other surfaces, such as a wall of a concrete form or mold to provide some additional support to the aperture-forming device 54. In some embodiments, the shape and size of the outer partial ring 14 and/or the at least one inner partial ring 16, as well as the rigidity of the material used to form these partial ring(s) may be optimized to allow ease of insertion and removal of the aperture-forming device 54 therein, while providing sufficient support for the aperture-forming device 54 during the concrete pouring process. In one embodiment, the outer partial ring 14 and the at least one inner partial ring 16 form an arc of greater than 180 degrees but less than 360 degrees. However, one of skill in the relevant art will understand that any appropriate shape of the outer partial ring 14 and the at least one inner partial ring 16 may be used to secure the aperture-forming device 54.

The design of the outer partial ring 14 and its flexible, yet supported, connection to the outer frame 12 allows the modular grid 10 to accommodate a range of diameters of the aperture-forming device 54. In the embodiments shown in FIGS. 5 and 7 where multiple inner partial rings 16 are included within the modular grid 10, the inner partial rings 16 and the outer partial ring 14 are sized and shaped to interact with the aperture-forming device 54 having a diameter ranging from approximately 2 to 6 inches. In other embodiments, one of skill in the relevant art will understand that the modular grid 10 may include one or more inner partial rings 16 sized and shaped to interact with one or more other objects having sizes and shapes other those specifically described herein.

Figure 2:
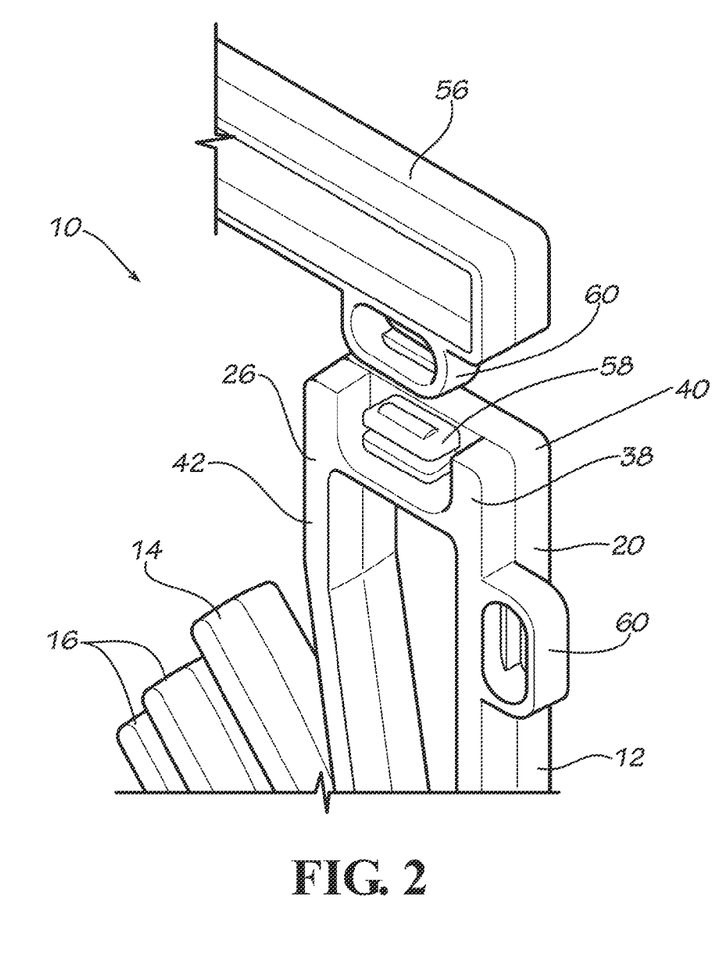
FIG. 2 is a perspective view of a portion of the modular grid of FIG. 1 and an upper bar in an uncoupled position.
Figure 3:
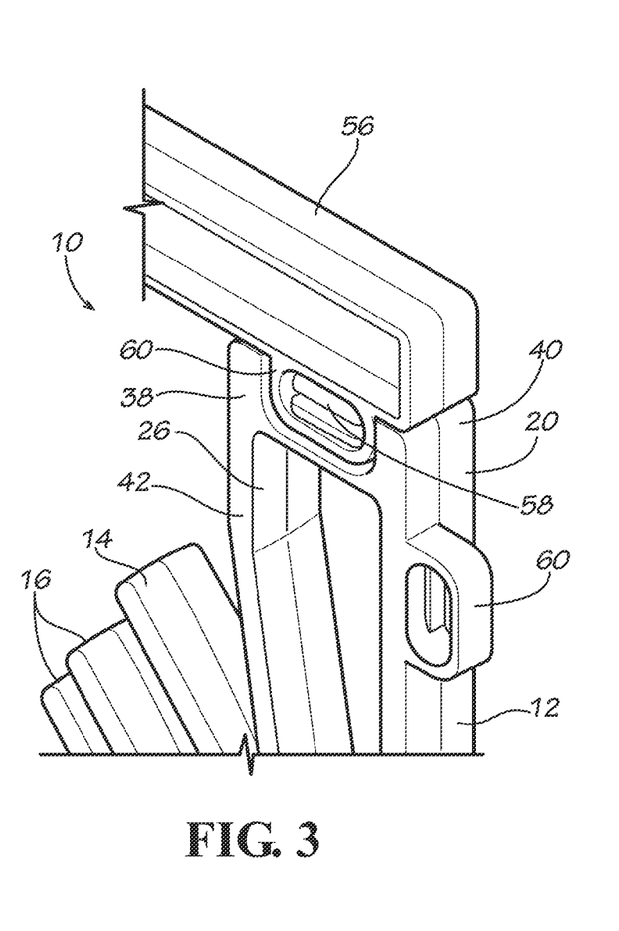
FIG. 3 is a perspective view of a portion of the modular grid of FIG. 1 and an upper bar in an coupled position.

In use, in some embodiments, the modular grid 10 is installed by securing the modular grid 10 to a concrete form. An upper bar 56 is then coupled to receptacles 58 that are located along the bars 38, 44 via tabs 60 that extend from the surface of the upper bar 56, as illustrated in FIGS. 2 and 3. The tabs 60 are shaped to interlock with the receptacles 58.

Figure 7:
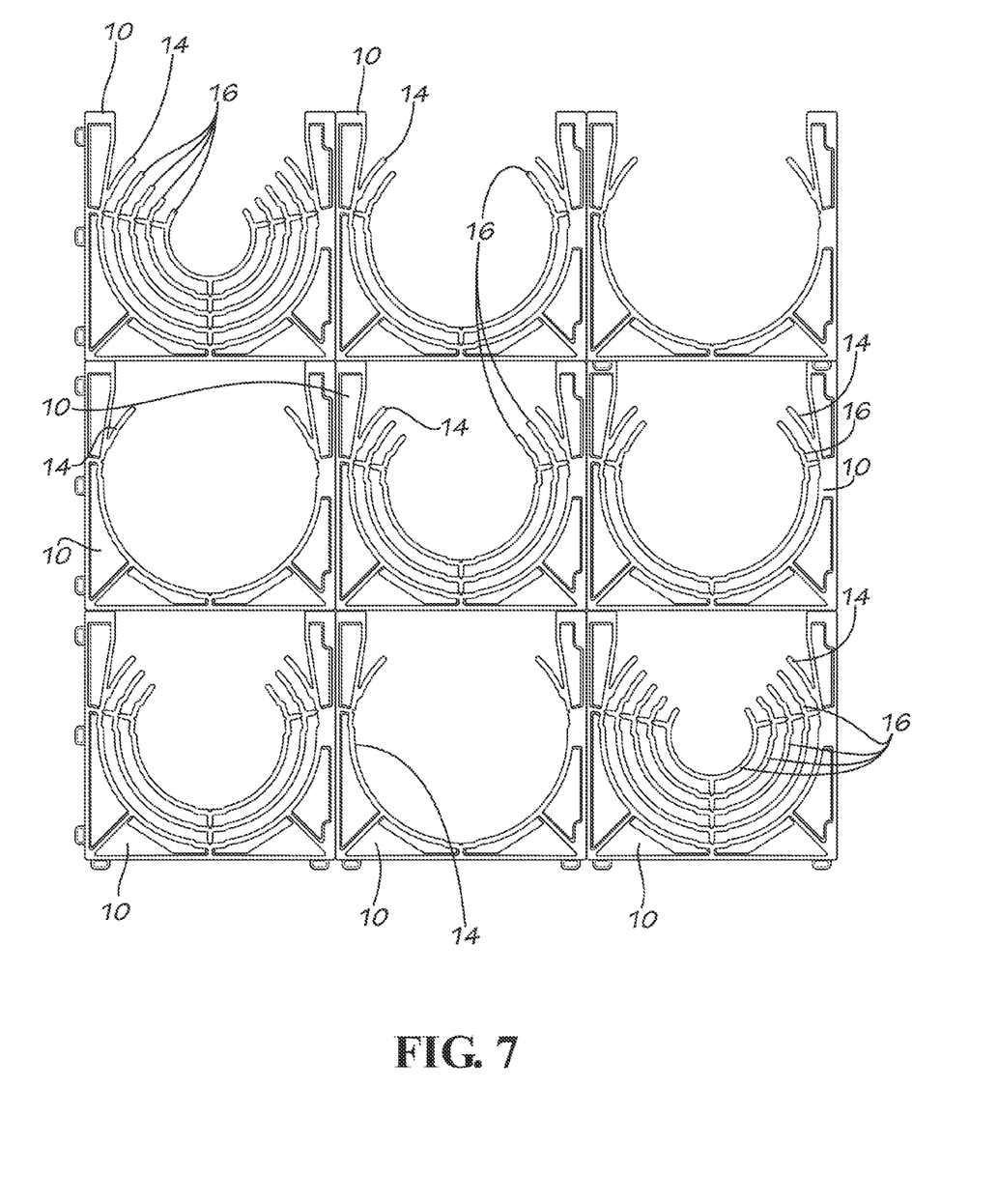
FIG. 7 is a front view of the modular grid of FIG. 1 coupled to multiple modular grids.

The aperture-forming device 54 may be installed within the modular grid 10 either before or after the upper bar 56 is connected to the modular grid 10. Depending on the size of the aperture-forming device 54, one or more inner partial rings 16 may be removed to obtain the appropriate fit between the aperture-forming device 54 and the modular grid 10. An example of a modular grid system having a variety of inner partial rings 16 removed is illustrated in FIG. 7. However, one of skill in the relevant art will understand that this is only one example and that any combination of the modular grids 10 and any combination of removal of the inner partial rings 16 are possible.

In embodiments where multiple aperture-forming devices 54 are to be installed within the concrete form, the multiple modular grids 10 are connected to one another via the tabs 60 that are located along the outer surfaces of the lower portion 18 and the side portion 20. As shown in FIGS. 5 and 7, with respect to the tabs 60 along the outer surface of the lower portion 18, the tabs 60 are designed to be inserted within the receptacles 58 that are located along the bars 38, 44 of a corresponding modular grid 10. The upper bar 56 is coupled to the receptacles 58 of each modular grid 10 that is not coupled to the lower portion 18 of another modular grid 10. The tabs 60 located along the outer surface of the side portion 20 are configured to interlock with the receptacles 58 located along the outer surface of the side portion 22 of a corresponding modular grid 10.

In one embodiment, the aperture-forming devices 54 are installed within each modular grid 10 either during or after the modular grids 10 are connected to one another and to the concrete form. Depending on the size of the aperture-forming device 54, one or more inner partial rings 16 may be removed from each modular grid 10 to obtain the appropriate fit between the aperture-forming device 54 and the modular grid 10.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A modular grid system comprising at least two modular grids, wherein each modular grid comprises: a. an outer frame; b. an outer partial ring positioned inside of and coupled to the outer frame, wherein the outer partial ring forms an arc of greater than 180 degrees but less than 360 degrees, the outer partial ring having a radius; and c. at least one inner partial ring positioned inside of and coupled to the outer partial ring via at least one securable connection, wherein the at least one inner partial ring forms an arc of greater than 180 degrees but less than 360 degrees, the inner partial ring having a radius that is shorter than the radius of the outer partial ring; wherein the outer partial ring and the inner partial ring are each configured to snap fit to an aperture forming device having a corresponding radius by surrounding more than one-half of a circumference of the aperture forming device.

2. The modular grid system of claim 1, wherein the at least one securable connection comprises at least one frangible connection.

3. The modular grid system of claim 2, wherein the at least one frangible connection comprises at least one recessed notch coupled to at least one tab.

4. The modular grid system of claim 1, wherein the outer frame, the outer partial ring, and the at least one inner partial ring are integrally formed.

5. The modular grid system of claim 1, wherein the outer frame substantially surrounds the outer partial ring and the at least one inner partial ring.

6. The modular grid system of claim 1, further comprising a plurality of modular grids.

7. The modular grid system of claim 1, wherein the at least two modular grids are oriented in the same direction.

8. The modular grid system of claim 1, wherein the outer partial ring and the inner partial ring are each configured to snap fit to an aperture forming device having an outer diameter ranging from 2 to 6 inches.

9. The modular grid system of claim 1, wherein the at least one inner partial ring comprises a plurality of inner partial rings, wherein at least one larger diameter inner partial ring is coupled to at least one smaller diameter inner partial ring via at least one securable connection.

10. The modular grid system of claim 9, wherein the at least one securable connection comprises at least one frangible connection.

11. The modular grid system of claim 10, wherein the at least one frangible connection comprises at least one recessed notch coupled to at least one tab.

12. The modular grid system of claim 1, wherein the outer frame comprises a removable bar.

13. A modular grid system comprising a first modular grid and a second modular grid, wherein: a. the first modular grid and the second modular grid are coupled via a plurality of interlocking tabs and receptacles; b. the first modular grid and the second modular grid are oriented in the same direction; and c. each modular grid comprises: i. an outer frame; ii. an outer partial ring positioned inside of and coupled to the outer frame, wherein the outer partial ring forms an arc of greater than 180 degrees but less than 360 degrees, the outer partial ring having a radius; and iii. at least one inner partial ring positioned inside of and coupled to the outer partial ring via at least one securable connection, wherein the at least one inner partial ring forms an arc of greater than 180 degrees but less than 360 degrees, the at least one inner partial ring having a radius that is shorter than the radius of the outer partial ring; wherein the outer partial ring and the at least one inner partial ring are each configured to snap fit to an aperture forming device having a corresponding radius by surrounding more than one-half of a circumference of the aperture forming device.

14. The modular grid system of claim 13, wherein the at least one securable connection comprises at least one frangible connection.

15. The modular grid system of claim 14, wherein the at least one frangible connection comprises at least one recessed notch coupled to at least one tab.

16. The modular grid system of claim 13, wherein the outer frame, the outer partial ring, and the at least one inner partial ring are integrally formed.

17. The modular grid system of claim 13, further comprising a plurality of modular grids.

18. The modular grid system of claim 13, wherein the first modular grid and the second modular grid are oriented in the same direction.

19. The modular grid system of claim 13, wherein the at least one inner partial ring comprises a plurality of inner partial rings, wherein at least one larger diameter inner partial ring is coupled to at least one smaller diameter inner partial ring via at least one securable connection.

20. The modular grid system of claim 13, wherein the outer frame comprises a removable bar.

21. A method of forming a modular grid system comprising the steps of: a. providing a first modular grid and a second modular grid, wherein each modular grid comprises: i. an outer frame; ii. an outer partial ring positioned inside of and coupled to the outer frame, wherein the outer partial ring forms an arc of greater than 180 degrees but less than 360 degrees, the outer partial ring having a radius; and iii. at least one inner partial ring positioned inside of and coupled to the outer partial ring via at least one securable connection, wherein the at least one inner partial ring forms an arc of greater than 180 degrees but less than 360 degrees, the at least one inner partial ring having a radius that is shorter than the radius of the outer partial ring; b. providing a first aperture-forming device and a second aperture-forming device; c. coupling the first modular grid to the second modular grid; d. coupling the first aperture-forming device to the first modular grid by snap fitting one of the partial rings of the first modular grid around the first aperture-forming device to surround more than one-half of a circumference of the first aperture-forming device; and e. coupling the second aperture-forming device to the second modular grid by snap fitting one of the partial rings of the second modular grid around the second aperture-forming device to surround more than one-half of a circumference of the second aperture-forming device.

22. The method of claim 21, wherein the at least one securable connection comprises at least one frangible connection.

23. The method of claim 22, wherein the at least one frangible connection comprises at least one recessed notch coupled to at least one tab.

24. The method of claim 21, wherein the outer frame, the outer partial ring, and the at least one inner partial ring are integrally formed.

25. The method of claim 21, wherein the first modular grid and the second modular grid are oriented in the same direction.

26. The method of claim 21, wherein each aperture-forming device comprises an outer diameter ranging from 2 to 6 inches.

27. The method of claim 21, wherein the at least one inner partial ring comprises a plurality of inner partial rings, wherein at least one larger diameter inner partial ring is coupled to at least one smaller diameter inner partial ring via at least one securable connection.

28. The method of claim 21, further comprising the steps: f. removing the at least one inner partial ring of the first modular grid having a diameter smaller than the first aperture-forming device; and g. removing the at least one inner partial ring of the second modular grid having a diameter smaller than the second aperture-forming device.

29. The method of claim 21, further comprising the steps of: f. providing a first removable bar and a second removable bar; g. coupling the first removable bar to the outer frame of the first modular grid; and h. coupling the second removable bar to the outer frame of the second modular grid.

30. The method of claim 21, further comprising: f. providing a third modular grid; g. providing a third aperture-forming device; h. coupling the third modular grid to either the first modular grid or the second modular grid; i. coupling the third aperture-forming device to the third modular grid.

31. The modular grid system of claim 1, wherein the outer partial ring and the inner partial ring are each configured to snap fit to an aperture forming device such that an entire circumference of the aperture forming device is contained within the outer frame of the modular grid.

32. The modular grid system of claim 13, wherein the outer partial ring and the inner partial ring are each configured to snap fit to an aperture forming device such that an entire circumference of the aperture forming device is contained within the outer frame of the modular grid.

33. The method of forming a modular grid system of claim 21, further comprising coupling the first aperture-forming device to the first modular grid such that an entire circumference of the first aperture-forming device is contained within the outer frame of the first modular grid; and coupling the second aperture-forming device to the second modular grid such that an entire circumference of the second aperture-forming device is contained within the outer frame of the second modular grid.

* * * * *